Figure 1:
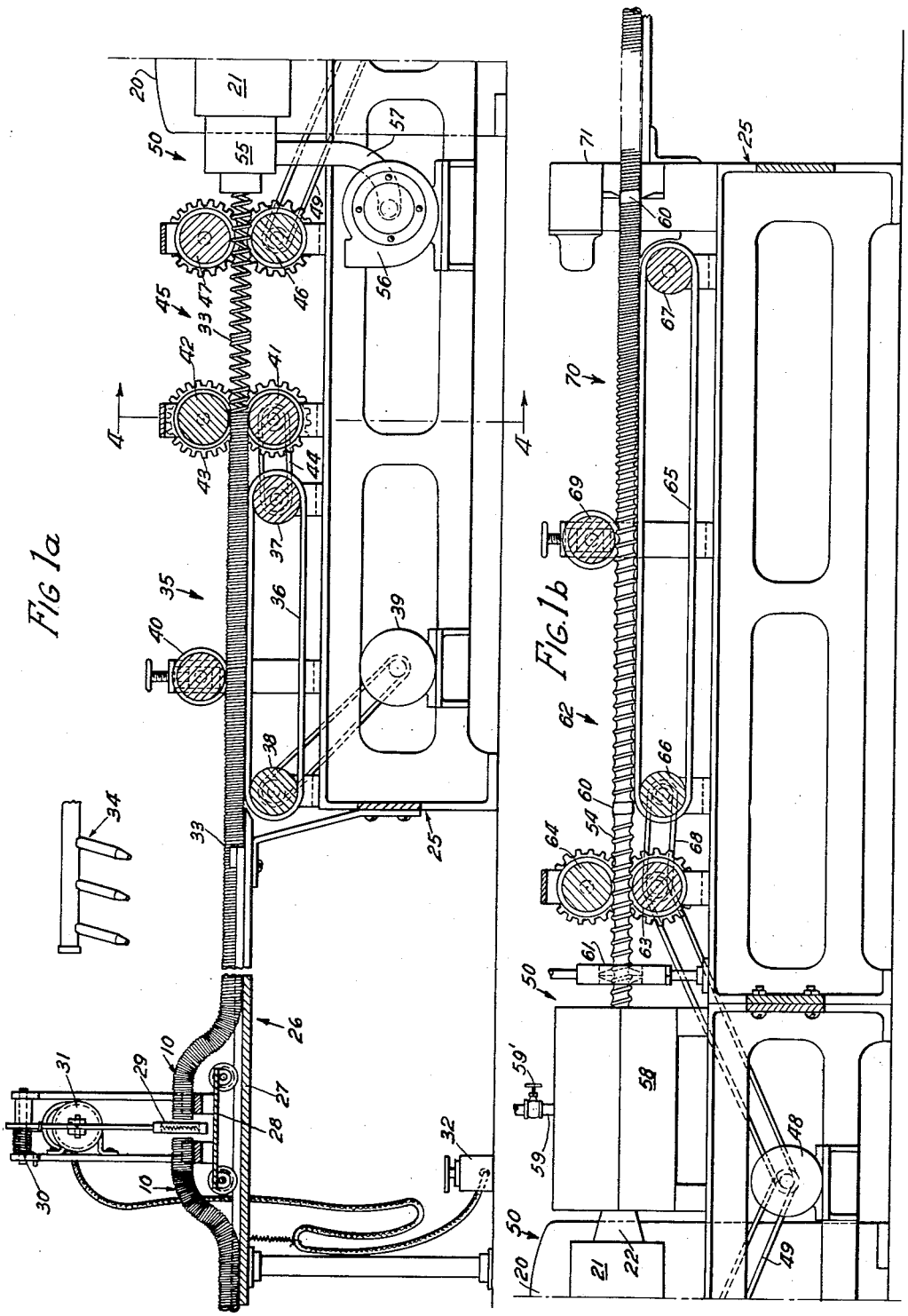

United States Patent Office 2,963,749
Patented Dec. 13, 1960

2,963,749

CONTINUOUS METHOD OF AND APPARATUS FOR MAKING EXTENSIBLE AND FLEXIBLE HOSE

Mary C. Pavlic, North Canton, Ohio, assignor to The Hoover Company, North Canton, Ohio, a corporation of Ohio Continuation of application Ser. No. 574,839, Mar. 29, 1956. This application Nov. 13, 1958, Ser. No. 773,687

19 Claims. (Cl. 18—59)

This application is a continuation of my copending application Serial No. 574,839, filed March 29, 1956, and now abandoned.

The present invention relates to a method of and an apparatus for making an extensible and flexible hose especially for use with suction cleaners but adaptable for making hose for a variety of purposes.

The method of the present invention is a continuous one wherein a plurality of lengths of cylindrical spirally wound reinforcing element coils, close coiled so that the turns lie in substantial contact with each other when the coils are in fully contracted condition are first secured together in end to end relationship. The coils are then stretched to increase the pitch thereof and held in that condition while a tube of an elastomeric thermoplastic material is extruded about the extended coils and into contact with the turns thereof. The material of the tube is then caused to move inward between the turns of the extended coils by drawing a vacuum on the interior thereof or applying air pressure on the exterior of the tube and the material of the tube then partially set in that condition. The hose carcass thus formed is then led away from the extruder and the turns of the coil are permitted to move towards each other as much as permitted by the tube wall while at the same time the material of the tube wall is caused to move further inward between the turns of the coil to form loops of slack material inwardly of the coil turns. The tube is then finally set in that condition by further cooling.

A suction applied to the interior of the tube or a pressure applied to its exterior as the hose carcass leaves the extruding die causes the material of the tube wall to move inwardly between the coil turns by stretching it and actually air molding it. That forms the genesis of the loops of slack material between the coil turns. When the coil turns are permitted to move toward each other, the excess material of the tube wall will naturally move inwardly between the coil turns by the force of the coil turns moving toward each other.

The final step of moving the material of the tube wall inwardly between the coil turns to form the loops of slack material is augmented by drawing a vacuum on the interior of the hose carcass although external air pressure may be used for the same purpose.

All of the above steps are carried out while the coils and carcass are being advanced through the various stations of the apparatus of the present invention.

The final setting operation under certain conditions may be carried out by the natural cooling of the hose from the air on its exterior and by the air flowing through its interior caused by the suction produced therein. At higher extruding speeds and with some thermoplastic materials it may be necessary to apply additional cooling for the final setting operation. With polyvinyl chloride, at low extruding speeds, it has been found that the natural cooling as outlined above is sufficient.

According to one modification of the method of the present invention a suction is applied to the interior of the hose carcass to cause the normal initial movement of the tube to a position between the coil turns and periodically an air pressure is applied to the exterior of the carcass to increase the depth of the inward movement of the hose wall so that deeper loops of slack material will be formed in the hose over portions of its length than elsewhere, the deeper loops preferably being formed adjacent the ends of the coil lengths.

The functions of the suction and pressure devices may be reversed if desired, the external pressure being used to produce the normal inward movement of the tube wall and the suction periodically applied to produce the increased inward movement of the tube wall.

According to another modification of the method of the present invention the suction on the interior of the hose carcass is periodically increased to produce the additional inward movement of the tube wall which eventually forms the deeper loops of slack material in the finished hose.

According to another modification of the method of the present invention the pitch of the coil turns is periodically increased as the coil passes through the extruder so that a greater length of tubing is provided per coil turn over a portion of the length of the coil which will eventually form the deeper loops of slack material.

The apparatus of the present invention comprises essentially a coupling station where the hose lengths are secured together in end to end relationship; a coil advancing station where the attached coils are advanced at one rate of speed; a coil expanding station where the coils are advanced at a second faster rate of speed to increase the pitch of the coil turns; a coil pitch holding station where the coils are advanced at the second rate of speed to maintain the coil pitch established at the coil expanding station, where a tube of an elastomeric thermoplastic material is extruded about the coils while in their expanded condition, where the tube wall is caused to move inwardly between the coil turns by means of a suction on the interior of the hose carcass or by means of a pressure applied to its exterior and where the tube is partially set by means of a cooling medium; a second advancing station where the hose carcass is moved away from the coil pitch holding station at the second rate of speed and a final hose forming station where the coil turns are permitted to move towards each other as far as permitted by the wall of the tube, where the tube wall is caused to move inwardly between the coil turns to form the loops of slack material and where the tube is subjected to a final setting operation.

According to one modification of the apparatus of the present invention a pressure box is provided at the coil pitch holding station where air pressure may be periodically applied to the exterior of the hose carcass to force the wall of the tube further inward between the coil turns to eventually form the deeper loops of slack material at the ends of the coil lengths.

According to another modification of the apparatus of the present invention a booster fan is provided to periodically apply an increased suction to the interior of the hose carcass to cause the material of the tube at the coil pitch holding station to move further inwardly between the coil turns to produce the deeper loops of slack material at the ends of the coil lengths.

According to another modification of the apparatus of the present invention a two-speed motor is provided which may be periodically and momentarily speeded up to increase the coil pitch at the coil pitch holding station to place a greater length of tube per coil turn over the coil so as to eventually form the deeper loops of slack material at the ends of the coil lengths.

The coil expanding station and the coil pitch holding station may be combined into a single station where the coil is both expanded and the pitch of its turns held uniform as the coil passes through the extruder. It is preferable, however, to separate the two stations in order to maintain a more uniform coil pitch as the coil passes through the extruder.

Where the term partially set is used herein as applied to thermoplastic material, it means that the material is cooled just sufficiently to hold its shape and to render it non-sticky so that it will not become bonded to other parts with which it may come in contact. The material is still sufficiently plastic to be further formed by the contraction of the coil turns. The term final setting means that the thermoplastic is cooled sufficiently to take its final finished form and cannot be further permanently deformed without the reapplication of heat. The material is, however, still sufficiently soft and flexible that it may be readily flexed.

While the reinforcing coils are herein disclosed as being in the form of a wire encased within a sheath of an elastomeric thermoplastic material, it is to be understood that it may be made of a bare metallic wire or a comparatively rigid resilient plastic material such as polyvinyl chloride using only a small percentage of plasticizer.

While the wire sheath and tube wall are disclosed herein as being made of an elastomeric thermoplastic material such as polyvinyl chloride it is to be understood that other suitable materials might be used where other properties are desired in the completed hose. For example, polyethylene may be used where low temperatures may be encountered and where chemical resistance is desired. Polymonochlorotrifluoroethylene may be used where high temperatures may be encountered.

The process may also be used in making a hose in which either the tube or the sheath or both are made of rubber. In that case a heated curing station would be necessary where the hose carcass moves away from the extrusion die and where the coil pitch is held extended during the curing operation. After leaving the curing station the coil turns would be permitted to move toward each other in the same manner as before.

Figure 2:
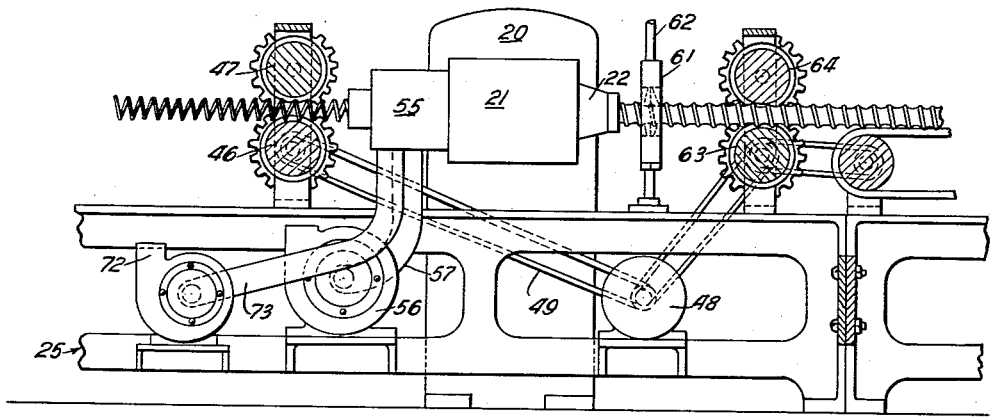
Figure 3:
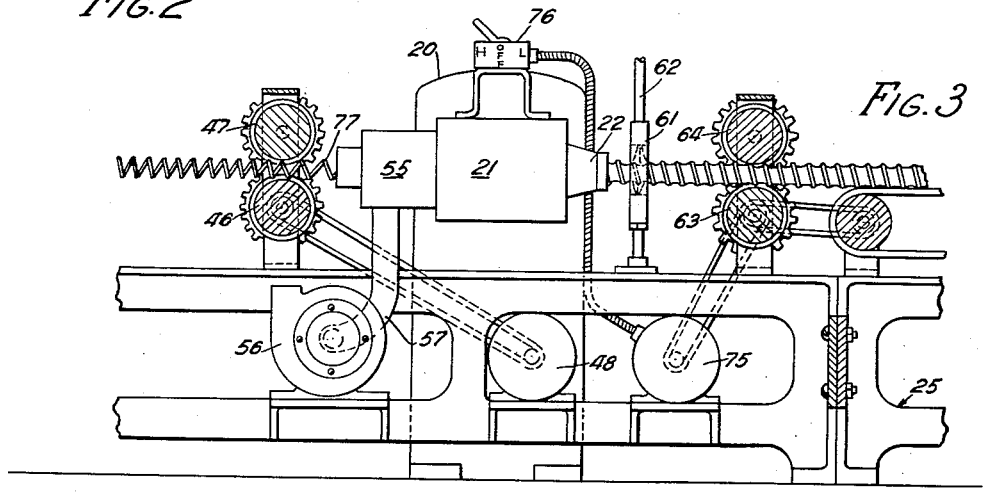
Figure 4:
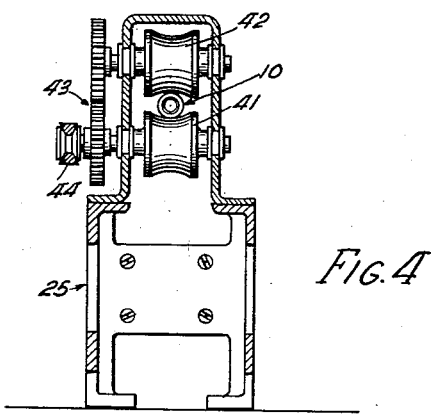
Figure 5:
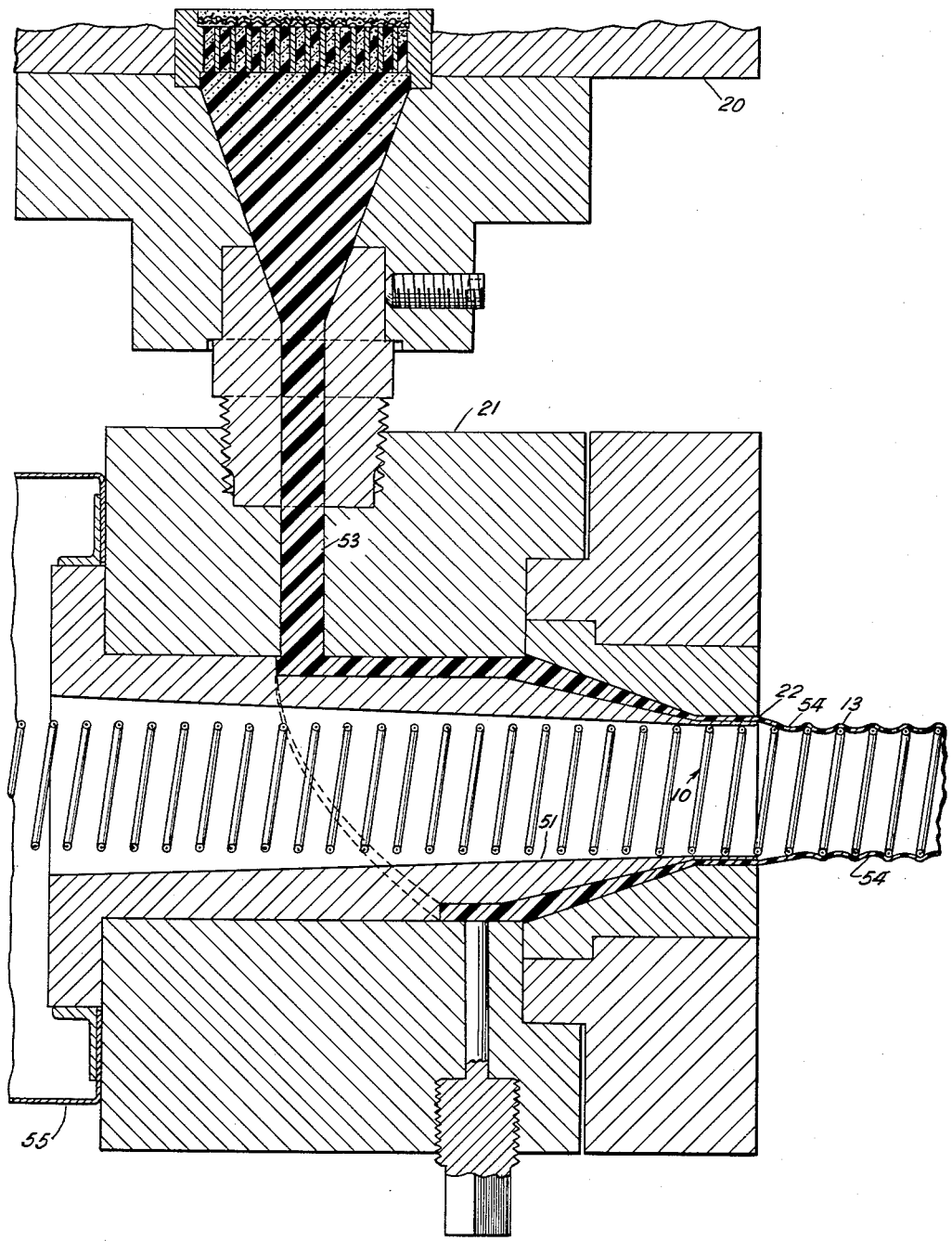
Figure 6:
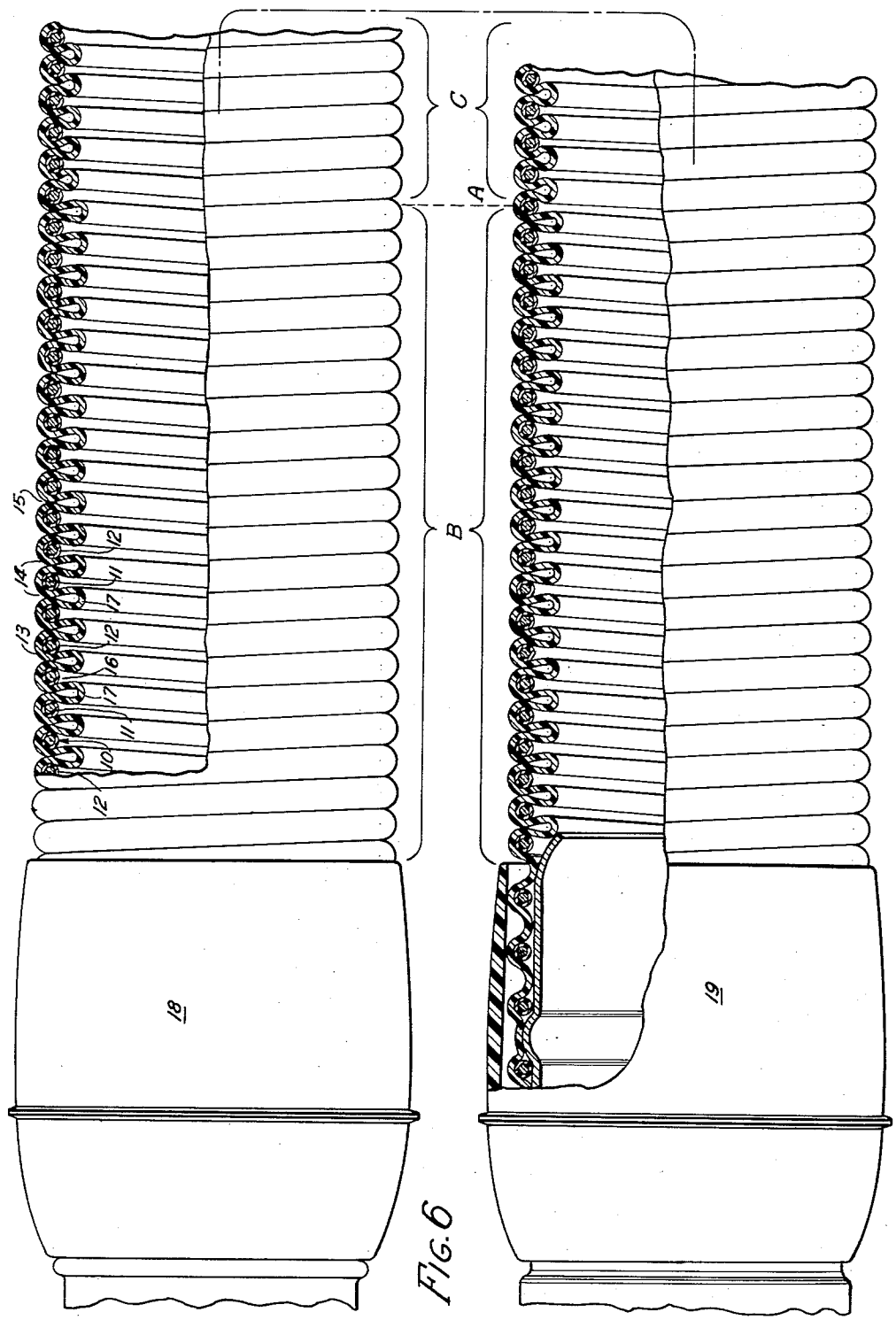

Other objects and advantages of the present invention will become apparent as the description proceeds when taken in connection with the accompanying drawings in which, Fig. 1a is a schematic view of one end of the hose making apparatus of the present invention, Fig. 1b is a schematic view of the other end of the hose making machine of Fig. 1a, Fig. 2 is a partial schematic view of a modified arrangement of the invention, Fig. 3 is a partial schematic view of a second modified arrangement of the present invention, Fig. 4 is a sectional view taken on line 4—4 of Fig. 1a and is common to all modifications of the invention, Fig. 5 is a sectional view through the crosshead of the extruder, and Fig. 6 is a sectional view of a finished hose made in accordance with the present invention.

The hose made according to the present invention is shown in Fig. 6. It comprises a prestressed close coiled spirally wound cylindrical reinforcing element generally indicated by the reference numeral 10. The coil 10 is preferably in the form of a metallic wire 11 such as steel or a high strength aluminum alloy sheathed within a covering of an elastomeric thermoplastic sheath 12 such as polyvinyl chloride or other similar or like material. The coil 10 is positioned within a single thickness tube 13 of an elastomeric thermoplastic material such as polyvinyl chloride or other such material.

The coil 10 is wound in such a manner that its turns will press against each other when free to do so. As shown in Fig. 6 the turns of coils 10 are prevented from coming into contact with each other by the walls 14 of the tube 13 which is in the form of a deeply corrugated tube having an outwardly facing spiral valley 15 and an inwardly facing spiral valley 16. The turns of the coil 10 are positioned within the inwardly facing valley 16 and are held therein by the frictional contact between the sheath 12 and the wall of the tube 13 which forms the inwardly facing spiral valley 16. The material of the sheath 12 and the tube 13 have a high frictional resistance when they come into contact with each other so that the turns of coil 10 are effectively held within the inwardly facing spiral valley 16.

The material of the tube 13 which forms the outwardly facing valleys 15 extends inwardly of the turns of coil 10 to form loose loops 17 of slack material which merely straighten out when the hose is extended without the necessity of stretching the material of the tube 13.

The hose made according to the present invention is more flexible and extensible at its ends adjacent the fittings 18 and 19. The dividing line between the more flexible and extensible end sections B and the central section C is shown by the line A of Fig. 6 which divides the hose into highly flexible and extensible sections B at the ends and a central less flexible and extensible section C. The increased flexibility and extensibility of the end sections B is obtained by providing more material of the tube wall which forms the loose loops 17 at the end sections than at the central section. Expressed in a different way the loops 17 are deeper at the end sections B than at the central sections C when the hose is in its static contracted condition.

While the dimensions of the wire 11, sheath 12, tube 13 and coil 10 may vary considerably depending upon the use to which the hose is to be put it has been found that a steel wire 0.058 inch in diameter having a tensile strength of 275,000 pounds per square inch is suitable, that the wall of the sheath may be 0.010 inch thick, that the tube 13 may be from 0.022 to 0.026 inch thick and the coil 10 may be 1.550 to 1.570 inches O.D. The foregoing dimensions have been found satisfactory in making an extensible and flexible hose suitable for use with a suction cleaner.

According to the method of the present invention the sheath 12 is first extruded about the wire 11 by a well known extruding process. The reinforcing element 10 which comprises a wire 11 and a sheath 12 is then close coiled in a manner known in the art into a cylindrical spiral so that its turns press against each other.

The coil 10 is formed in lengths just long enough to form a finished hose of the desired length. In practice it has been found that the unextended length of coil 10 may be about 39 to 40 inches.

The lengths of hose thus formed are attached together as will be hereinafter explained so as to form a continuous length of coil which may then be passed through the apparatus of the present invention to form the finished hose.

Figures 1a and 1b show one form of the apparatus of the present invention. An extruder 20 of well known construction forms one element of the apparatus. The extruder 20 is provided with crosshead 21 which terminates in a die orifice 22 through which the coil 10 is passed as will be explained hereinafter.

In alignment with the crosshead 21 and in front of the extruder 20 is a frame work generally indicated by the reference numeral 25 which supports the various parts of the apparatus of the present invention.

The lengths of the coil springs may be secured together in any suitable manner either before or during the continuous hose making process of the present invention. For the purpose of illustrating one way by which the coil lengths may be secured together a coil assembling station is generally indicated at 26 in Fig. 1a. The station 26 includes platform 27 on which a carriage 28 is reciprocably mounted. Pivotally mounted upon the carriage 28 is a continuously energized electric heater 29 which is spring biased to a retracted position by a torsion spring 30 and is moved to the position shown by an electric solenoid 31 adapted to be energized by foot operated push-push switch 32.

In operation, the ends of two lengths of coil 10 are placed on the carriage 28 with the end turns thereof facing each other. The electric heater is continuously energized during operation of the apparatus and is moved to a position between the end turns of the coil as shown in Fig. 1a by depressing the switch 32 and energizing solenoid 31.

As the carriage 28 is moved along the platform 27 the sheaths 12 of the end turns of coils 10 are heated to a fusing temperature. When that occurs the switch 32 is again depressed to deenergize solenoid 31 whereby the spring 30 moves the heater 29 to its retracted position. The ends of coils 10 are then pressed together to weld the end turns together as shown at 33, the coils being cooled by the air jets 34 to set the fused sheaths 12. The coil lengths 10 are then placed on the platform 27, the carriage 28 retracted manually, by a spring or otherwise to its original position ready for a succeeding welding operation.

To the right of the welding station, as viewed in Fig. 1a is a coil advancing station 35 by which the attached coils 10 are advanced through the apparatus of the present invention. The coil advancing mechanism includes an endless belt conveyor 36 carried by rollers 37 and 38. The roller 38 is driven by an electric motor 39 which may be energized simultaneously with the other power driven elements of the apparatus of the present invention.

The coils 10 are held against the advancing belt 36 by a pressure roll 40.

The apparatus of the coil advancing station 35 includes a pair of opposed advancing rolls 41 and 42 shown in section in Fig. 4. The rolls 41 and 42 are geared together to rotate at the same speed by gearing 43. The periphery of rolls 41 and 42 are concave in shape as shown in Fig. 4 to apply pressure to the top and bottom sides of coils 10 to advance them into the succeeding station of the apparatus of the present invention. The roll 41 is driven by a belt 44 from the roll 37 so that the belt 36 and the periphery of rolls 41 and 42 move at the same speed.

To the right of the coil advancing station is a coil pitch extending station 45 where the turns of the coil 10 are spaced apart for a purpose which will presently appear. Two rolls 46 and 47 perform the coil extending function. These rolls are in all respects the same as the rolls 41 and 42 except that they are driven at a faster speed. The rolls 46 and 47 are geared together so as to rotate at the same speed and the lower roll is driven by a motor 48 (Fig. 1b) by means of a belt 49.

The ratio of the speed between the rolls 41, 42 and the rolls 46, 47 may vary depending upon the type of hose desired. It has been found that in making an extensible hose for use with suction cleaners that the peripheral speed of the rolls 41, 42 may be two feet per minute and the peripheral speed of rolls 46, 47, 10 feet per minute with the extruder 20, 21 operating to extrude material at a somewhat slower speed. It is also found that the speed of rolls 41, 42 and 46, 47 may be increased to 4 and 20 feet per minute respectively when the extruding speed is increased.

Thus a coil having an original length of 40 inches will be extended to approximately 200 inches as it passes through the rolls 46, 47 and the coil turn spacing will be about 0.408 inch.

To the right of the coil pitch extending station is a coil pitch holding station 50 partially shown in Fig. 1a and partially shown in Fig. 1b and extending from the rolls 46, 47 to the rolls 63, 64 to be later described. The extruder 20 and its attached crosshead 21 is positioned at the coil pitch holding station 50.

As shown in Fig. 5 the crosshead 21 is formed with a passage 51 for the coil 10, with an annular extruding orifice 22 and with a passage 53 leading to the extruder 20 and through which the plastic material is fed under suitable pressure to the orifice 22. The size of the orifice 22 may vary depending upon the size of hose to be formed and the thickness of the tube wall 13 desired. For making hose suitable for use with suction cleaners with a coil diameter of from 1.550 to 1.570 inches, a coil turn spacing of 0.408 inch and final thickness of the tube 13 of 0.022 to 0.026 inch, it has been found that the orifice 22 should have an O.D. of 1.760 inches and an I.D. of 1.650 inches and the spring passage an I.D. of 1.580 inches.

Thus the thickness of the tube as it emerges from the orifice 22 is 0.055 inch but since the coil 10 is moving somewhat faster than the material is emerging from the orifice 22, the material is stretched so as to have a thickness of from 0.022 to 0.026 inch and in stretching is reduced in diameter so as to come into contact with the turns of coil 10 as shown in Fig. 5.

In front of the crosshead 21 and also positioned at the coil pitch holding station 50 is a vacuum box 55 connected to a suction fan 56 by a conduit 57. The lowered pressure thus produced is reflected to the interior of the orifice 22 and to the interior of the hose carcass as it leaves the crosshead 21 and serves to draw the wall tube 13 downwardly between the turns of the coil 10 as shown at 54 of Fig. 5 and as will be explained in more detail hereinafter. Since the turns of coil 10 are spaced apart at the orifice 22 a sufficient length of material is provided between the coil turns to form the deep loops 17 of slack material when the coil contracts.

According to one form of the invention, in order to form deeper loops of material at the end sections B of the hose a pressure box 58 is positioned about the carcass as it emerges from the die orifice 22 and also positioned at the coil pitch retaining station 50. The pressure box 58 is connected to a suitable source of air under pressure by a conduit 59. Air under pressure is admitted into the box 58 and its pressure may be controlled by a pressure reducing valve 59'. The air is admitted periodically into the box 58 just prior to, during and just after a joint 60 (indicating where adjacent lengths of coil are together) passes through the die 22. The air under pressure will cause the soft material of the tube wall to stretch and form a deeper corrugation over that length of hose than over the remainder. The joint 60 also serves as an indication as to where the hose should be severed to provide the proper length of hose for the use desired.

It is to be understood that hose may be made with corrugations of uniform depth along its length in which case the pressure box 58 may be omitted or not used.

The functions of the vacuum box 55 and the pressure box 58 may be reversed if desired, the pressure box 58 being used for forming the shallow corrugations and the suction fan 56 periodically operated to produce the deeper corrugations at the joints 60. Alternately, the suction box 55 may be omitted entirely and the deeper corrugations periodically formed by opening the valve 59' wider to increase the pressure within the pressure box 58.

To the right of the pressure box 58 and also within the coil pitch holding station 50 is a cooling station in the form of an annular water spray ring 61 where the material forming the hose carcass wall is cooled and partially set. Cold water is supplied to the ring 61 by a conduit leading to any suitable source of cold water under sufficient pressure to form a spray. More than one water spray ring may be provided if additional cooling is found to be necessary.

The material of the hose carcass is only partially set at the water ring 61 so that it will retain its form and yet be sufficiently soft to be further formed at the final forming station as will be explained hereinafter.

To the right of the coil pitch retaining station 50 is a second coil advancing station 62 which includes rolls 63 and 64 geared together to rotate at the same speed and driven from the motor 48 at the same speed as the rolls 46, 47. The hose advancing station 62 also includes an endless belt conveyor 65 extending over rolls 66 and 67, the roll 66 being driven from the roll 63 by means of a belt 68 so that the conveyor belt 65 moves at the same speed as the peripheral speed of rolls 63, 64. A pressure roll 69 serves to hold the hose carcass against the conveyor belt 65 so that up to that point its speed of travel is the same as the speed at which it emerges from the die orifice 22.

To the right of the pressure roll 69 is a final forming station 70 where the hose carcass wall is finally deeply corrugated to form the loops 17 of slack material.

Up to the rolls 69 the coil turns are held spaced and the material of the carcass wall extends inwardly between the coil turns only to the extent caused by the suction within the hose carcass and by the stretching of the wall produced in the pressure box 58. The corrugations in the hose carcass will be deeper adjacent the joints 60 than along the central portion of the coil sections.

After the hose carcass passes the pressure roll 69, there is some slippage on the conveyor belt 65 as the coil turns tend to return into contact with each other. As the hose carcass leaves the conveyor belt 65 the coil turns have returned toward each other as far as possible and the hose takes the form shown in Fig. 6.

The material of the tube wall 13 is not completely set at this point and lies in shallow corrugations of excess material between the coil turns as the hose carcass leaves the pressure roll 69. As the coil turns move toward each other the excess material of the tube wall between the coil turns is forced inwardly to form the deep folds 17 of slack material in the finished hose. This action is augmented by the suction on the interior of the hose carcass which is reflected from the vacuum box 55.

Beyond the end of the conveyor belt 65 the hose carcass passes through a cut off station represented by a motor driven cut off device generally represented by the reference numeral 71 which is operated to sever the carcass in suitable lengths as the joints 60 pass beneath it.

Fig. 2 shows another way by which the deeper loops 17 at the end sections B of the finished hose may be formed. In this case instead of using a pressure box at the take-off end of the crosshead 21 a booster fan 72 is connected to the vacuum box 55 by a duct 73 whereby the absolute pressure within the vacuum box 55 may be periodically decreased as the joints 33 between the adjacent coil sections approach, pass through and leave the die orifice 22. This lowered absolute pressure within the hose carcass also acts to stretch the soft material of the tube between the coil turns as the hose carcass emerges from the die orifice 22.

Fig. 3 shows the preferred method by which the deeper loops 17 may be formed in the finished hose at the end sections B. In this modification the rolls 63 and 64 are driven by a two speed motor 75 separate from the motor 48 which drives the rolls 46 and 47. The motor 75 is controlled by a two position switch 76 so that when a joint 33 between the two coil turns approaches the die 22 the motor 75 may be speeded up momentarily to stretch the coil turns between the die 22 and the rolls 46, 47 farther apart as shown at 77. This spacing should be 0.550 inch. When those coil turns are stretched sufficiently the switch 76 is immediately operated to return the motor to its normal speed. As the stretched coil turns 77 pass through the orifice 22 a greater length of material will be extruded onto the coil turns than at other points and when the coil turns contract deeper loops 17 of slack material will be formed at the end sections B of the finished hose. It is to be noted that according to this modification the material of the tube wall forming the deeper loops 17 are of the same thickness as the material of the other loops.

The coil stretching station 45 and the coil pitch holding station 50 may be combined by omitting rolls 46, 47, in which case the rolls 63, 64 would do the coil stretching as well as holding the coil pitch uniform as the coil passes through the orifice 22. However, it is preferable that the rolls 46, 47 be used because of the more uniform coil spacing which is thereby produced.

*Operation*

The sheath 12 is first extruded about the wire 11 and the sheathed wire close coiled into lengths suitable for forming the finished hose desired, the coil turns being so wound as to lie in substantial contact with each other when the coil is in its fully contracted condition.

The coil lengths are then placed on the carriage 28 with their free ends facing each other and the ends welded together as previously described, the point where the coil ends are welded together forming an indicia mark to indicate the point where the hose carcass is to be severed in forming the finished hose. The joints 33 will also form an indicia mark to indicate when the operation of the apparatus is to be modified to form the deeper loops 17.

The jointed coil lengths are then fed onto the conveyor belt 36 and between the rolls 41, 42 at the coil advancing station 35.

The joined coils then pass between rolls 46, 47 at the coil stretching station 45. The rolls 46, 47 have a peripheral speed of about five times that of the rolls 41, 42 and the coil turns are spread apart to a pitch of 0.408 inch against their natural tendency to move into contact with each other.

The extended coils 10 then pass through the coil pitch holding station 50 where the coil pitch is normally held constant by the fact that the rolls 63, 64 are rotating at the same speed as the rolls 46, 47.

At the coil pitch holding station 50 the extended coils pass through the vacuum box 55 and through the orifice 22 of a crosshead 21 where warm plastic material is extruded about the coils. The coils are moving through the orifice 22 at a slightly greater rate than the material is being extruded from the orifice 22 so that the ring of material formed at the orifice is drawn downwardly into contact with the coil turns as shown in Fig. 5. The extrusion temperature is such that no bond is formed between the tube wall 13 and the sheath 12.

The lowered pressure produced in the vacuum box 55 will reduce the pressure on the inside of the ring of plastic material issuing from the orifice 22 and draw the soft material inwardly between the coil turns as shown at 54 in Fig. 5. That is an important feature of the present invention since it forms the genesis of what will later become the deep loops 17 of slack material between the coil turns.

After leaving the die orifice 22, the coils 10 with the tube 13 thereon pass through the pressure box 55 of Fig. 1b and through the cooling ring 61. In the modification of Figs. 2 and 3 it passes directly through the cooling ring 61. At the cooling ring 61 the sheath is partially set so that it will hold its shape and will not be sticky and may be handled as it passes through the remainder of the apparatus of the present invention and yet is soft enough that it may be further formed at the final forming station 70.

After passing through the cooler 61 the hose carcass passes through the second advancing station 62. The rolls 63, 64 and the conveyor belt travel at the same speed as that of the rolls 46, 47 which serves to hold the coil turns spaced apart as they pass through the extruder to receive the tube 13 thereover. In the example given the coil turn spacing is 0.408 inch but this spacing may vary widely depending upon the flexibility and extensibility of the hose desired.

As the hose carcass leaves the pressure roll 69 there will be slippage of the carcass relative to the conveyor belt 65 as the coil turns tend to move into contact with each other. As the hose carcass leaves the conveyor belt 65 the coil turns will return towards each other to the maximum extent permitted by the walls 14 of the tube 13 which lie between adjacent coil turns. The material of the tube 13 not having been completely set at this point and extending inwardly between the coil turns in shallow corrugations 54, the force of the coil turns moving toward each other will cause the material of the tube wall to move further inward between the coil turns to form the loops 17 of slack material in the finished hose. The reduced pressure within the hose carcass reflected from the vacuum box 55 will accelerate this action.

At the station 70 the material of the hose carcass is fully set by the natural cooling of the air on the outside of the hose carcass and the air flowing through the interior of the carcass caused by the reduced suction box 55. That cooling has been found to be sufficient for a material such as polyvinyl chloride at low extrusion speeds but if other materials or a higher extrusion speed should be used additional cooling at the station 70 may be necessary.

As the fully contracted hose carcass leaves the conveyor belt 65 it passes beneath the power operated cutter 71 where it is severed into the desired lengths it being noted that the joints 60 which are visible through the wall of the tube 13 serve as an indicia to indicate where the hose carcass should be severed.

Thus the length of the finished hose is determined by the length of the coils 10 before they are welded together at the station 26. The length of the various finished hose will vary slightly as conditions may vary during manufacture but are approximately 7½ feet long when fully contracted and may be easily extended to twice that length by the application of a 6 pound pull.

The material from which the sheath 12 and tube 13 is made may vary depending upon the use to which the finished hose is to be put. For suction cleaners it has been found that an elastomeric thermoplastic material such as polyvinyl chloride having a tensile strength of 2,000 pounds per square inch at 80° F. is suitable. The material of the sheath 12 and of the tube 13 is preferably made of the same hardness so that the plasticizer will not migrate from the material of the sheath to the material of the tube.

It is to be understood that the dimensions, strengths, materials, etc, given herein are exemplary only and may vary widely depending upon the type of hose desired. For example, polyethylene could be used for making a hose which might be subjected to very low temperatures or to the corrosive action of chemicals and polymonochlorotrifluoroethylene could be used for making hose subjected to high temperatures. The figures, materials, etc. given herein represent only one set of conditions which have been found to be satisfactory in practice.

If it is desired that the loops 17 be deeper at sections B of the finished hose, air under pressure is applied to the pressure box 58 of Fig. 1b or the booster fan 72 of Fig. 2 operated as the joints 33 approach, pass through and leave the orifice 22. Either of those expedients will serve to stretch the material of tube 13 to a greater extent between the coil turns and provide more slack material to form the deeper loops 17. However, the preferable method of forming the deeper loops 17 at the section B is to use the apparatus of Fig. 3. As a joint 33 approaches the extruder 21, the switch 76 is actuated to put the motor 75 in high speed momentarily to stretch the coil turns between the die orifice 22 and the rolls 46, 47 to a spacing of 0.550 inch and to then immediately actuate the switch 76 to return the motor 75 to its low speed.

During that operation a few coil turns immediately in front of the die orifice 22 may be extended somewhat by stretching the material of the tube 13 but that will merely provide a gradual transition from deep to shallow grooves 17. Also as the extended coil 10 moves away from the rolls 46, 47 and through the die orifice, the coil turns leaving the rolls will stretch out and gradually lessen the distance between the coil turns until they have all returned to the original uniform spacing of 0.408 inch. In the meantime material will be extruded about the gradually lessening extended coil turns as the coil advances through the extruder. That also will merely provide a gradual transition from deep to shallow loops 17.

While the changes in the operation of the apparatus of the present invention and the operation of the cut-off device 71 has been described as manually actuated it is to be understood that those operations may be automatically controlled. For example, the pressure roll 40 could be a measuring device to count the coils 10 as they pass beneath it and constructed to operate switches in the proper sequence to perform the various controlling functions which have been described as manually actuated. Other automatic controls could also be devised by use of the joints 33 and 60 as a means of initiating controlling operations.

While I have shown and described but three embodiments of the process and apparatus of my invention, it is to be understood that those embodiments are to be taken as illustrative only and not in a limiting sense. I do not wish to be limited to the specific method and apparatus shown and described but wish to include all equivalent variations thereof except as limited by the scope of the claims.

I claim:

1. The method of making an extensible and flexible hose by the use of a cylindrical spirally coiled reinforcing coil close coiled so that its coil turns tend to move into substantial contact with each other when free to do so comprising, extending said coils so that its coil turns are spaced apart and extruding a plastic tube about the periphery of said coil while it is in its extended condition, causing the material of said tube to move partially inwardly between the turns of said coil while it is in its extended condition, partially setting said tube while said coil is in its extended condition and with its walls partially between the turns of said coil and permitting said coil to contract so that its turns will move toward each other as far as permitted by the walls of said tube to form loose folded loops of wall material between the turns of said coil and finally setting said tube in its folded condition.

2. The method of making a hose according to claim 1 in which the material of said tube is caused to move inwardly between the coil turns by drawing a vacuum on the interior of said tube as it is extruded over said coil.

3. The method of making a hose according to claim 1 in which the material of said tube is caused to move inwardly between the turns of said coil by the application of a pressure to the exterior of said tube as it emerges from said extruder.

4. The method of making a hose according to claim 1 in which the material of said tube is caused to move inwardly between the coil turns by drawing a vacuum on the interior of said tube as it is extruded over said coil and by the application of a pressure to the exterior of said tube as it emerges from said extruder.

5. The method of making a hose according to claim 1 including the step of periodically increasing the pitch of said coil as said tube is extruded thereover.

6. The method of making a hose according to claim 2 in which an increased suction is periodically applied to said tube as it is being extruded about said coil to cause the material of the wall of said tube to move further inward between the turns of said coil over portions only of said tube.

7. The method of making the hose according to claim 2 in which pressure is periodically applied to the exterior of said tube as it emerges from said extruder to cause the material wall of said tube to move further inward between the turns of said coil over portions only of said tube.

8. The method of making hose according to claim 3 in which increased pressure is periodically applied to the exterior of said tube as it emerges from said extruder to cause the material of the wall of said tube to move further inward between the turns of said coil over portions only of said tube.

9. The method of making a hose according to claim 3 in which a suction is periodically drawn on the interior of said tube as it is being extruded over said coil to cause the material of said tube to move further inward between the turns of said coil over portions only of said tube.

10. The method of making an extensible and flexible hose by the use of a cylindrical spirally coiled reinforcing coil close wound so that its turns tend to move into substantial contact with each other when free to do so comprising, extending said coil so that its turns are spaced apart, extruding a thin plastic tubing about and into contact with the turns of said coil while the latter is in its extended condition, collapsing said coil to permit the turns to move toward each other to the extent permitted by the wall of said tube and to cause the wall of said tube to move inwardly between the turns of said coil into a deep spiral fold so as to form loose loops of slack tube wall material inwardly of the turns of said coil and setting the wall of said tube in its folded condition whereby said hose may be extended without stretching the material forming said loops of slack material.

11. The continuous method of making an extensible and flexible hose from a plurality of lengths of cylindrical spirally wound reinforcing coils close wound so that the coil turns thereof substantially contact each other when free to do so comprising, attaching said coils together in end to end relationship to form joints between adjacent coils, continuously feeding said attached coils into an extending station where the turns thereof are spaced apart from each other except at said joints, continuously extruding a tube of plastic material about the periphery of said coils and into contact with the turns thereof while said turns are in extended condition, causing the material of said tube to move inward between the turns of said coil while the latter is in its extended condition whereby the position of said joints will be visible, permitting the turns of said coil to move toward each other and causing the wall of said tube to move further inward between the turns of said coil, setting said tube and severing said hose at said visible joints.

12. The method of making a hose according to claim 11 in which said coils are in the form of metallic wires sheathed in a plastic sheath and said coils are secured together by welding the sheaths of the end turns of adjacent coils together.

13. The continuous method of making a hose according to claim 11 in which the wall of said tube is caused to move further inward between the turns of said coils on either side of said joints to thus position a greater length of said tube between the turns of said coils adjacent their ends.

14. The continuous method of making a hose according to claim 11 in which said turns of said coil are extended to a greater pitch on either side of said joints as said tube is extruded thereover so as to position a greater length of said tube between the turns of said coils adjacent their ends.

15. The continuous method of making an extensible flexible hose from a plurality of lengths of cylindrical spirally wound reinforcing coils close wound so that the coil turns thereof are in substantial contact when said coils are in fully contracted condition comprising, securing said coils together in end to end relationship to form a continuous coil, advancing said coil at one rate of speed through one zone, advancing said coil at a second higher rate of speed through a second zone while continuing to advance said coil into said second zone at said one speed whereby the pitch of said coil is increased, advancing said coil through a third zone at said second speed to maintain the coil pitch established in said second zone while continuing to advance said coil through said first and second zones, extruding a tube of plastic material about the periphery of said coil at said third zone, causing the material of the wall of said tube to move inward between the turns of said coil at said third zone, partially setting the material of said tube at said third zone, permitting the turns of said coil to move towards each other while causing the material of said tube to move further inward between the turns of said coil to form loops of slack tube material inwardly of the turns of said coil while continuing to advance said coil and finally setting the material of said tube in its collapsed condition.

16. The continuous method of making a hose according to claim 15 including the step of periodically causing the material of said tube to move further inwardly between the turns of said coil at said third station whereby deeper loops of tube material are formed over portions only of said coil.

17. The method of making a flexible hose comprising, forming a close wound cylindrical spirally coiled reinforcing element, extending said reinforcing element lengthwise to space its coil turns axially of each other, extruding a thin tube of an elastomeric thermoplastic material while in a plastic state about the periphery of said extended reinforcing element while maintaining a vacuum on the interior of said tube as it is extruded so as to draw the material of said tube between the spaced turns of said reinforcing element to form a corrugated hose and cooling said corrugated hose to set said thermoplastic material in its tubular corrugated form about the spaced turns of said reinforcing element.

18. The method of making a flexible hose from a coil of wire coiled into a cylindrical spiral with the coil turns thereof normally pressing against each other and an elastomeric thermoplastic material comprising, extending said coil axially to space its coil turns axially of each other, reducing said elastomeric thermoplastic material to a plastic state, extruding a tube of said plastic thermoplastic material about the periphery of said coil while the latter is in its extended condition, causing the walls of said tube to move inwardly between the spaced turns of said coil as said tube is extruded thereover to form a corrugated carcass and treating said carcass to set the material of said carcass in its corrugated form.

19. The method of making a flexible hose comprising, forming a cylindrical spiraly coiled reinforcing element, extruding a thin tube of an elastomeric thermoplastic material while in a plastic state about the periphery of said reinforcing element while the coil turns of said reinforcing element are held in an axial spaced relationship and while a pressure difference is maintained between the interior and exterior of said tube as it is extruded such as to cause the material of said tube to move inwardly between the spaced turns of said reinforcing element to form a corrugated hose and cooling said corrugated hose to set said thermoplastic material in its tubular corrugated form about the turns of said reinforcing element.

References Cited in the file of this patent

UNITED STATES PATENTS

| | | |
|---|---|---|
| 2,110,226 | Hill | Mar. 8, 1938 |
| 2,396,059 | Roberts | Mar. 5, 1946 |
| 2,550,555 | Hallam et al. | Apr. 24, 1951 |
| 2,641,302 | Martin et al. | June 9, 1953 |
| 2,766,806 | Rothermel et al. | Oct. 16, 1956 |

FOREIGN PATENTS

| | | |
|---|---|---|
| 350,390 | Great Britain | May 27, 1931 |